United States Patent
Zhang et al.

(10) Patent No.: US 11,595,588 B2
(45) Date of Patent: Feb. 28, 2023

(54) IMAGE CAPTURING METHOD AND TERMINAL DEVICE

(71) Applicant: Huawei Technologies Co., Ltd., Shenzhen (CN)

(72) Inventors: Liyao Zhang, Beijing (CN); Jing Ma, Beijing (CN); Zhibiao Zhao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 5 days.

(21) Appl. No.: 17/284,117

(22) PCT Filed: Oct. 10, 2019

(86) PCT No.: PCT/CN2019/110377
§ 371 (c)(1),
(2) Date: Apr. 9, 2021

(87) PCT Pub. No.: WO2020/073957
PCT Pub. Date: Apr. 16, 2020

(65) Prior Publication Data
US 2021/0385368 A1     Dec. 9, 2021

(30) Foreign Application Priority Data
Oct. 11, 2018  (CN) .......................... 201811185480.8

(51) Int. Cl.
*H04N 5/235*     (2006.01)
*H04N 9/04*      (2006.01)
*H04N 9/77*      (2006.01)

(52) U.S. Cl.
CPC ......... *H04N 5/2355* (2013.01); *H04N 5/2353* (2013.01); *H04N 9/045* (2013.01); *H04N 9/77* (2013.01)

(58) Field of Classification Search
CPC .... H04N 5/2355; H04N 5/2353; H04N 9/045; H04N 9/77
See application file for complete search history.

(56) References Cited

U.S. PATENT DOCUMENTS

| | | |
|---|---|---|
| 6,204,881 B1 | 3/2001 | Ikeda et al. |
| 8,525,900 B2 | 9/2013 | Garten |
| 8,570,396 B2 | 10/2013 | Rapaport |
| 9,167,174 B1 | 10/2015 | Rivard et al. |
| 9,204,113 B1 | 12/2015 | Kwok et al. |

(Continued)

FOREIGN PATENT DOCUMENTS

| | | |
|---|---|---|
| CN | 102457669 A | 5/2012 |
| CN | 102970549 A | 3/2013 |

(Continued)

OTHER PUBLICATIONS

Yuhan Liao, "Research on the Solution of High Dynamic Range Scenes in Digital Photography," Zhejiang University, 2016, 1 page.

*Primary Examiner* — Ahmed A Berhan
(74) *Attorney, Agent, or Firm* — Conley Rose, P.C.

(57) ABSTRACT

An image capturing method and a terminal device are provided. The method includes entering a camera application to start a lens and display a viewfinder interface, converting an original image captured by the lens into a red-green-blue (RGB) image, and decreasing luminance of the RGB image to be less than first luminance or increasing the luminance of the RGB image to be greater than second luminance, to obtain a first image; converting the RGB image into N frames of high-dynamic-range (HDR) images, and fusing color information of pixels in any same location on the first image and the N frames of HDR images to obtain a final image.

18 Claims, 7 Drawing Sheets

(56) References Cited

U.S. PATENT DOCUMENTS

| | | | |
|---|---|---|---|
| 9,344,638 B2* | 5/2016 | Zhang | G06V 10/60 |
| 9,437,171 B2 | 9/2016 | Narasimha et al. | |
| 9,538,093 B2* | 1/2017 | Chen | G06T 5/50 |
| 2003/0117412 A1 | 6/2003 | Brooksby et al. | |
| 2009/0086061 A1 | 4/2009 | Asoma | |
| 2010/0103194 A1 | 4/2010 | Chen et al. | |
| 2011/0176024 A1 | 7/2011 | Kwon et al. | |
| 2013/0120615 A1 | 5/2013 | Hirooka et al. | |
| 2014/0307117 A1 | 10/2014 | Feng et al. | |
| 2015/0130967 A1 | 5/2015 | Pieper | |
| 2015/0195441 A1 | 7/2015 | Chen et al. | |
| 2015/0350513 A1* | 12/2015 | Zhang | G06T 5/40 |
| | | | 348/362 |
| 2017/0026594 A1 | 1/2017 | Shida et al. | |
| 2017/0180759 A1 | 6/2017 | Mertens | |
| 2020/0068108 A1 | 2/2020 | Dai et al. | |

FOREIGN PATENT DOCUMENTS

| | | |
|---|---|---|
| CN | 103247036 A | 8/2013 |
| CN | 104320575 A | 1/2015 |
| CN | 104869297 A | 8/2015 |
| CN | 105578068 A | 5/2016 |
| CN | 105704349 A | 6/2016 |
| CN | 105872393 A | 8/2016 |
| CN | 105933617 A | 9/2016 |
| CN | 106791475 A | 5/2017 |
| CN | 106920221 A | 7/2017 |
| CN | 107205120 A | 9/2017 |
| CN | 107451979 A | 12/2017 |
| CN | 107800971 A | 3/2018 |
| CN | 108307109 A | 7/2018 |
| CN | 108335279 A | 7/2018 |
| CN | 108391059 A | 8/2018 |
| CN | 111050143 A | 4/2020 |
| EP | 3200446 A1 | 8/2017 |
| GB | 2464574 A | 4/2010 |
| JP | 2015154447 A | 8/2015 |
| JP | 2015207861 A | 11/2015 |
| RU | 2017107185 A | 9/2018 |
| WO | 2010082692 A1 | 7/2010 |
| WO | 2015184208 A1 | 12/2015 |

* cited by examiner

IMAGE CAPTURING METHOD AND TERMINAL DEVICE

CROSS-REFERENCE TO RELATED APPLICATIONS

This application is a U.S. National Stage of International Patent Application No. PCT/CN2019/110377 filed on Oct. 10, 2019, which claims priority to Chinese Patent Application No. 201811185480.8 filed on Oct. 11, 2018. Both of the aforementioned applications are hereby incorporated by reference in their entireties.

TECHNICAL FIELD

This application relates to the field of image capturing technologies, and in particular, to an image capturing method and a terminal device.

BACKGROUND

With the advancement of terminal technologies, various functions of terminal devices are constantly improved. A mobile phone is used as an example, and an image capturing function is one of functions frequently used by a user. In addition, the user pays more attention to imaging quality of the mobile phone.

However, it is difficult to control exposure of an image captured by using an existing mobile phone, and a problem of overexposure or underexposure easily occurs. As a result, details on a bright part of an image are clear but details on a dark part of the image are lost, or details on a dark part are clear but details on a bright part are lost, finally leading to poor imaging quality of the image.

SUMMARY

Embodiments of this application provide an image capturing method and a terminal device, to improve image capturing quality.

According to a first aspect, an embodiment of this application provides an image capturing method. The method may be performed by a terminal device. The method includes: In response to a user operation, the terminal device opens a camera application to start a lens and display a viewfinder interface. The terminal device converts an original image captured by the lens into an RGB image. The terminal device decreases luminance of the RGB image to be less than first luminance or increases the luminance of the RGB image to be greater than second luminance, to obtain a first image, where the first luminance is greater than the second luminance. The terminal device converts the RGB image into N frames of HDR images by using an HDR technology, where the N frames of HDR images have different luminance, and the luminance of the N frames of HDR images is greater than the first luminance when the luminance of the RGB image is decreased to be less than the first luminance, or the luminance of the N frames of HDR images is less than the second luminance when the luminance of the RGB image is increased to be greater than the second luminance, where N is a positive integer. The terminal device fuses color information of pixels in any same location on the first image and the N frames of HDR images to obtain a final image. The terminal device displays the final image on the viewfinder interface.

In this embodiment of this application, the terminal device performs different adjustment for the luminance of the RGB image and the luminance of the plurality of frames of HDR images. In this way, details on the RGB image and the HDR images are different. The terminal device fuses the color information of the pixels in the same location on the RGB image and the plurality of HDR images to obtain the image having good quality, thereby improving image capturing quality.

In a possible design, that the terminal device fuses color information of pixels in any same location on the first image and the N frames of HDR images to obtain a final image may be specifically: The terminal device determines, from a plurality of fusion curves based on an exposure parameter used to capture the original image, a first fusion curve corresponding to the exposure parameter, where the first fusion curve is used to indicate a correspondence between color information and a fusion coefficient. The terminal device uses pixels in a same location on the N frames of HDR images as first pixels, and performs the following operations for each first pixel: The terminal device determines, on the first fusion curve based on color information of the first pixel on each frame of HDR image, a fusion coefficient corresponding to the color information, and the terminal device fuses, based on the fusion coefficient, the color information of the first pixel on each frame of HDR image and color information of a second pixel on the first image, to obtain the final image, where the second pixel is a pixel that is in a location the same as the location corresponding to the first pixel and that is determined by the terminal device based on a matching algorithm.

In this embodiment of this application, the terminal device determines the fusion curve based on the exposure parameter used to capture the original image, and then determines the fusion coefficient on the fusion curve based on the color information of the pixel on the HDR image. The terminal device fuses, based on the fusion coefficient, the color information of the pixels in the same location on the RGB image and the HDR image, to obtain the image having good quality, thereby improving the image capturing quality.

In a possible design, that the terminal device determines, on the first fusion curve based on color information of the first pixel on each frame of HDR image, a fusion coefficient corresponding to the color information may specifically include: The terminal device determines, on the first fusion curve based on R color information of the first pixel on each frame of HDR image, a first fusion coefficient corresponding to the R color information, to obtain N first fusion coefficients. The terminal device determines, on the first fusion curve based on G color information of the first pixel on each frame of HDR image, a second fusion coefficient corresponding to the G color information, to obtain N second fusion coefficients. The terminal device determines, on the first fusion curve based on B color information of the first pixel on each frame of HDR image, a third fusion coefficient corresponding to the B color information, to obtain N third fusion coefficients. Correspondingly, that the terminal device fuses the color information of the first pixel on each frame of HDR image and color information of a second pixel on the first image based on the fusion coefficient may specifically include: The terminal device fuses the R color information of the first pixel on each frame of HDR image and R color information of the second pixel based on the N first fusion coefficients. The terminal device fuses the G color information of the first pixel on each frame of HDR image and G color information of the second pixel based on the N second fusion coefficients. The terminal device fuses the B color information of the first pixel on each frame of HDR image and B color information of the second pixel based on the N third fusion coefficients.

In this embodiment of this application, the terminal device determines the fusion coefficients respectively based on three types of color information of the first pixel on the HDR image. The terminal device fuses, based on a fusion coefficient corresponding to a type of color information, the color information of pixels in a same location on the RGB image and the HDR image. To be specific, when fusing the color information of the pixels in the same location on the RGB image and the HDR image, the terminal device fuses each type of color information of the pixels in the same location on the RGB image and the HDR image. In this manner, the image having good quality is obtained, thereby improving the image capturing quality.

In a possible design, that the terminal device fuses the R color information of the first pixel on each frame of HDR image and R color information of the second pixel based on the N first fusion coefficients may meet the following formula requirement:

$$R_{dst}=(1-\Sigma_{i=1}^{N}f_i)\cdot R_{src}+\Sigma_{i=1}^{N}f_i\cdot R_{res}^{i}, \text{ where}$$

$R_{src}$ is a value of the R color information of the second pixel on the first image, $R_{res}^{i}$ is a value of R color information of a first pixel on an $i^{th}$ frame of HDR image in the N frames of HDR images, N is a quantity of frames of HDR images, $f_i$ is a first fusion coefficient in the N first fusion coefficients that is determined on the first fusion curve based on the value of the R color information of the first pixel on the $i^{th}$ frame of HDR image, and $R_{dst}$ is a value of R color information of a pixel on the final image.

In this embodiment of this application, when the terminal device fuses the R (red) color information of the pixels in the same location on the RGB image and the HDR image, the foregoing formula requirement is met. In this manner, the image having good quality is obtained, thereby improving the image capturing quality.

In a possible design, that the terminal device fuses the G color information of the first pixel on each frame of HDR image and G color information of the second pixel based on the N second fusion coefficients may meet the following formula requirement:

$$G_{dst}=(1-\Sigma_{i=1}^{N}f_i)\cdot G_{src}+\Sigma_{i=1}^{N}f_i\cdot G_{res}^{i}, \text{ where}$$

$G_{src}$ is a value of the G color information of the second pixel on the first image, $G_{res}^{i}$ is a value of G color information of the first pixel on the $i^{th}$ frame of HDR image in the N frames of HDR images, N is the quantity of frames of HDR images, $f_i$ is a second fusion coefficient in the N second fusion coefficients that is determined on the first fusion curve based on the value of the G color information of the first pixel on the $i^{th}$ frame of HDR image, and $G_{dst}$ is a value of R color information of a pixel on the final image.

In this embodiment of this application, when the terminal device fuses the G (green) color information of the pixels in the same location on the RGB image and the HDR image, the foregoing formula requirement is met. In this manner, the image having good quality is obtained, thereby improving the image capturing quality.

In a possible design, that the terminal device fuses the B color information of the first pixel on each frame of HDR image and B color information of the second pixel based on the N third fusion coefficients may meet the following formula requirement:

$$B_{dst}=(1-\Sigma_{i=1}^{N}f_i)\cdot B_{src}+\Sigma_{i=1}^{N}f_i\cdot B_{res}^{i}, \text{ where}$$

$B_{src}$ is a value of the B color information of the second pixel on the first image, $B_{res}^{i}$ is a value of B color information of the first pixel on the $i^{th}$ frame of HDR image in the N frames of HDR images, N is the quantity of frames of HDR images, $f_i$ is a third fusion coefficient in the N third fusion coefficients that is determined on the first fusion curve based on the value of the G color information of the first pixel on the $i^{th}$ frame of HDR image, and $B_{dst}$ is a value of B color information of a pixel on the final image.

In this embodiment of this application, when the terminal device fuses the B (blue) color information of the pixels in the same location on the RGB image and the HDR image, the foregoing formula requirement is met. In this manner, the image having good quality is obtained, thereby improving the image capturing quality.

According to a second aspect, an embodiment of this application provides a terminal device. The terminal device includes a lens, a display, a memory, and a processor. The processor is configured to: in response to a user operation, open a camera application to start a lens. The display is configured to display a viewfinder interface of the camera application. The lens is configured to capture an original image. The memory is configured to store one or more computer programs. When the one or more computer programs stored in the memory are executed by the processor, the terminal device is enabled to implement the method in the first aspect or any possible design of the first aspect.

According to a third aspect, an embodiment of this application further provides a terminal device. The terminal device includes modules/units performing the method in the first aspect or any possible design of the first aspect. The modules/units may be implemented by hardware, or may be implemented by hardware executing corresponding software.

According to a fourth aspect, an embodiment of this application further provides a computer-readable storage medium. The computer-readable storage medium includes a computer program. When the computer program is run on a terminal, the terminal device is enabled to perform the method in the first aspect or any possible design of the first aspect.

According to a fifth aspect, an embodiment of this application further provides a computer program product. When the computer program product is run on a terminal device, the terminal device is enabled to perform the method in the first aspect or any possible design of the first aspect.

DESCRIPTION OF EMBODIMENTS

Figure 1:
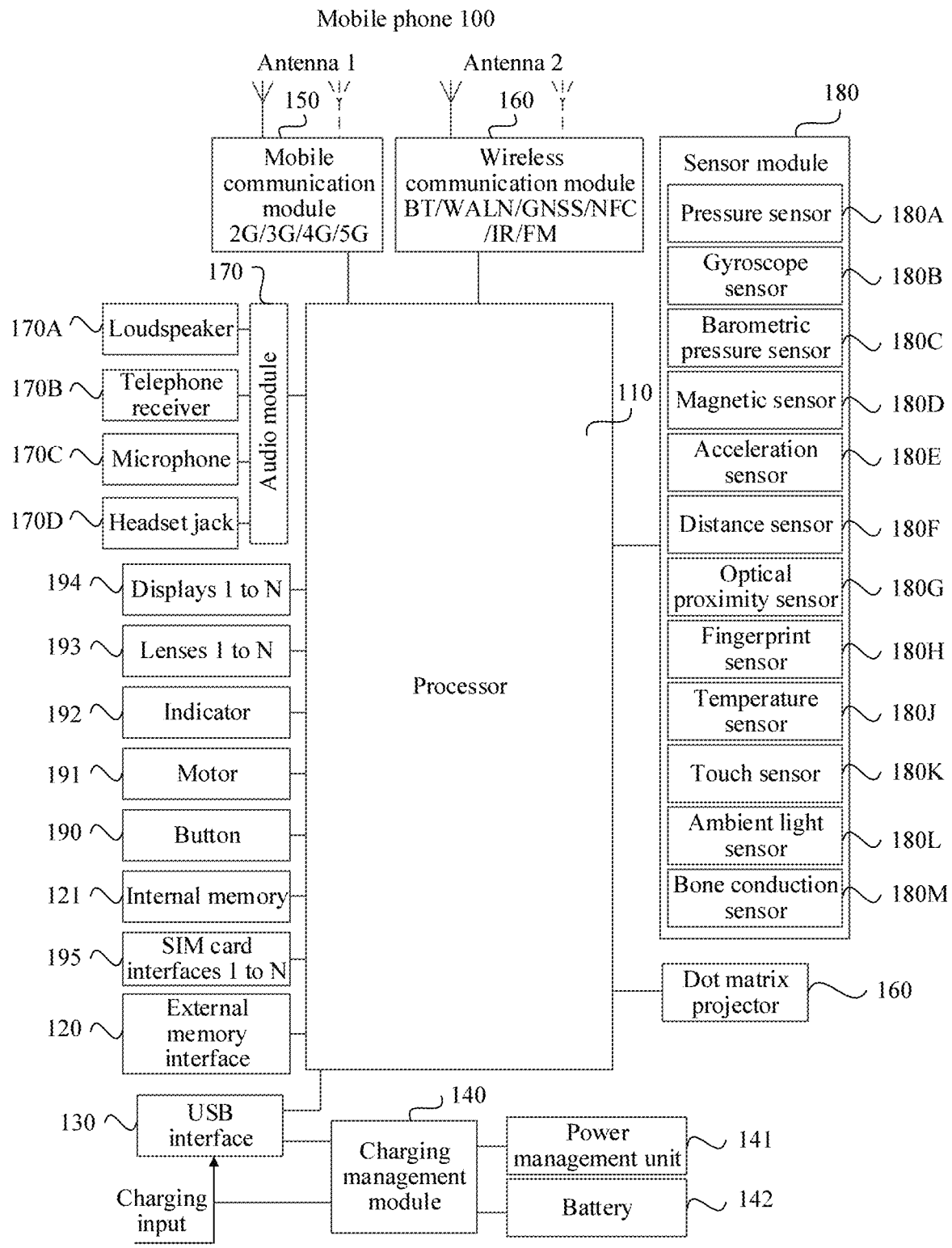
FIG. 1 is a schematic structural diagram of a mobile phone 100 according to an embodiment of this application.

The following describes the technical solutions in the embodiments of this application with reference to the accompanying drawings in the embodiments of this application.

The following describes some terms in the embodiments of the present invention, to help a person skilled in the art have a better understanding.

An exposure parameter used in the embodiments of this application is a parameter that is set when an image is captured by using a terminal device. The exposure parameter may be used to indicate a total quantity of light rays that are emitted by scenery and that are received when the scenery is photographed by using the device. The exposure parameter may include exposure time, exposure intensity, and/or the like.

Generally, a value of the exposure parameter may determine a value of luminance of a finally captured image. For example, if the exposure time is relatively long or the exposure intensity is relatively high, an intake light amount is relatively large when an image is captured by using the device. Therefore, luminance of the captured image is relatively high. If the exposure time is relatively short or the exposure intensity is relatively low, an intake light amount is relatively small when an image is captured by using the device. Therefore, luminance of the captured image is relatively low.

A pixel used in the embodiments of this application is a smallest imaging element on one frame of image. One pixel may correspond to one coordinate point on an image. One pixel may correspond to one parameter (for example, grayscale), or may correspond to a set of a plurality of parameters (for example, grayscale, luminance, and color). Color information is used as an example. Generally, a frame of image has three base colors, namely, red (Red, which is represented by using R below), green (Green, which is represented by using G below), and blue (Blue, which is represented by using B below), and another color may be obtained by combining the three base colors. Therefore, each pixel on a frame of image may include three types of color information, namely, R color information, G color information, and B color information, and for the pixels, values of the R color information are different, values of the G color information are different, and values of the B color information are different. For example, when values of R color information, G color information, and B color information corresponding to a pixel are 0, the pixel presents white, and when values of R color information, G color information, and B color information corresponding to a pixel are 255, the pixel presents black.

An original image used in the embodiments of this application is an output image of a lens, namely, original data that is obtained after the lens converts collected information about light reflected by an object into a digital image signal, and the original data is not processed. For example, the original image may be data in a raw format. The data in the raw format may include information about the object and a lens parameter. The lens parameter may include international standardization organization (ISO), a shutter speed, an aperture value, white balance, and the like. The original image is also an input image of an ISP and a neural network unit such as a neural-network processing unit (NPU) below.

A first image used in the embodiments of this application is an output image of the ISP. The first image is obtained after the ISP processes the original image to obtain an image in an RGB format or a YUV format and adjusts luminance of the image in the RGB format or the YUV format. A specific value used by the ISP to adjust the luminance of the image in the RGB format or the YUV format may be set by a user, or may be set before delivery of a mobile phone. The first image is also an input image of a processor such as a graphics processing unit (GPU) below.

An HDR image used in the embodiments of this application, namely, a high dynamic range (HDR) image, is an output image of the neural network unit. The neural network unit may obtain the HDR image based on a high dynamic range technology in the prior art. For the high dynamic range technology, details are not described in the embodiments of this application. The HDR image is also an input image of the processor (for example, the GPU below).

It should be noted that an "image" used in the embodiments of this application, for example, the original image, the first image, or the HDR image, may be a picture, or may be a set of some parameters (for example, pixel information, color information, and luminance information).

"A plurality of" used in the embodiments of this application means at least two.

It should be noted that, the term "and/or" in this specification describes only an association relationship for describing associated objects and represents that three relationships may exist. For example, A and/or B may represent the following three cases: Only A exists, both A and B exist, and only B exists. In addition, unless otherwise stated, the character "/" in this specification generally indicates an "or" relationship between the associated objects. In addition, in the descriptions of the embodiments of the present invention, terms such as "first" and "second" are merely used to distinguish between descriptions, but cannot be understood as indicating or implying relative importance, and cannot be understood as indicating or implying a sequence.

The following introduces a terminal device, a graphical user interface (GUI) used in such terminal device, and an embodiment using such terminal device. In some embodiments of this application, the terminal device may be a portable terminal, for example, a mobile phone or a tablet computer, including a component having an image capturing function such as a lens. An example embodiment of the portable terminal device includes but is not limited to a portable terminal device using iOS®, Android®, Microsoft®, or another operating system. The portable terminal device may alternatively be another portable terminal device, for example, a digital camera, provided that the terminal device has an image capturing function. It should be further understood that in some other embodiments of this application, the terminal device may not be a portable terminal device, but is a desktop computer or the like having an image capturing function.

Generally, the terminal device supports a plurality of applications, for example, one or more of the following applications: a camera application, an instant message transceiver application, a photo management application, and the like. There may be a plurality of instant message transceiver applications, for example, WeChat, Tencent chatting software (QQ), WhatsApp Messenger, Line (Line), photo sharing (instagram), Kakao Talk, and Ding Talk. A user may send information such as text, voice, a picture, a video file, and various other files to another contact by using an instant message transceiver application, or the user may implement a video or audio call with another contact by using an instant message transceiver application.

That the terminal device is a mobile phone is used as an example. FIG. 1 is a schematic structural diagram of a mobile phone 100.

The mobile phone 100 may include a processor 110, an external memory interface 120, an internal memory 121, a universal serial bus (USB) interface 130, a charging management module 140, a power management unit 141, a battery 142, an antenna 1, an antenna 2, a mobile communication module 150, a wireless communication module 160, an audio module 170, a loudspeaker 170A, a telephone receiver 170B, a microphone 170C, a headset jack 170D, a sensor module 180, a button 190, a motor 191, an indicator 192, a lens 193, a display 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the example of the structure in this embodiment of this present invention does not specifically limit the mobile phone 100. In some other embodiments of this application, the mobile phone 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors.

The controller may be a nerve center and a command center of the mobile phone 100. The controller may generate an operation control signal based on an instruction operation code and a time sequence signal, to complete control of a read instruction and an execution instruction.

A memory may be further disposed in the processor 110, to store an instruction and data. In some embodiments, the memory in the processor 110 is a cache. The memory may store an instruction or data that is just used or cyclically used by the processor 110. If the processor 110 needs to use the instruction or data again, the processor 110 may directly invoke the instruction or data from the memory, to avoid repeated access, reduce a waiting time of the processor 110, and improve system efficiency.

The mobile phone 100 implements a display function by using the GPU, the display 194, the application processor, and the like. The GPU is an image processing microprocessor, and connects the display 194 and the application processor. The GPU is configured to perform mathematical and geometric calculation, and is configured for graphics rendering. The processor 110 may include one or more CPUs, and execute a program instruction to generate or change display information.

The display 194 is configured to display an image, a video, and the like. The display 194 includes a display panel. The display panel may use a liquid crystal display (LCD), an organic light-emitting diode (OLED), an active-matrix organic light emitting diode (AMOLED), a flexible light-emitting diode (FLED), a Miniled, a MicroLed, a Micro-oLed, quantum dot light emitting diodes (QLED), and the like. In some embodiments, the mobile phone 100 may include one or N displays 194, where N is a positive integer greater than 1.

The mobile phone 100 may implement an image capturing function by using the processor 110, the lens 193, the display 194, and the like. The lens 193 is configured to capture a static image or a video. Generally, the lens 193 may include a photosensitive element such as a lens group and an image sensor. The lens group includes a plurality of optical lenses (concave lenses or convex lenses), configured to collect an optical signal reflected by a to-be-photographed object and transmit the collected optical signal to the image sensor. The image sensor generates an original image of the to-be-photographed object based on the optical signal. The image sensor sends the generated original image to the processor 110. The processor 110 runs an image capturing algorithm provided in this embodiment of this application, to process the original image, to obtain a processed image. The display 194 displays the processed image.

The internal memory 121 may be configured to store computer executable program code, where the executable program code includes an instruction. The processor 110 runs the instruction stored in the internal memory 121, to perform various function applications and data processing of the mobile phone 100. The internal memory 121 may include a program storage region and a data storage region. The program storage region may store an operating system, an application required by at least one function (for example, a voice playback function, or an image playing function), and the like. The data storage region may store data (for example, audio data and an address book) and the like created in a process of using the mobile phone 100. In addition, the internal memory 121 may include a high-speed random access memory, or may include a non-volatile memory, for example, at least one magnetic disk storage device, a flash memory, or a universal flash storage (UFS).

The distance sensor 180F is configured to measure a distance. The mobile phone 100 may measure a distance through infrared light or laser light. In some embodiments, in a photographing scenario, the mobile phone 100 may measure a distance by using the distance sensor 180F, to implement quick focusing. In some other embodiments, the mobile phone 100 may further detect, by using the distance sensor 180F, whether a person or an object approaches.

The optical proximity sensor 180G may include, for example, a light emitting diode (LED) and an optical detector such as a photodiode. The light emitting diode may be an infrared light emitting diode. The mobile phone 100 may emit infrared light to the outside through the light emitting diode. The mobile phone 100 detects reflected infrared light from a nearby object by using the photodiode. When sufficient reflected light is detected, it may be determined that there is an object near the mobile phone 100. When insufficient reflected light is detected, the mobile phone 100 may determine that there is no object near the mobile phone 100. The mobile phone 100 may detect, by using the optical proximity sensor 180G, that a user holds the mobile phone 100 and enables the mobile phone 100 to approach the ear for conversation, to save power when a screen is automatically turned off. The optical proximity sensor 180G may be further configured to automatically unlock or lock a screen in a leather cover mode and a pocket mode.

The ambient light sensor 180L is configured to sense luminance of ambient light. The mobile phone 100 may adaptively adjust luminance of the display 194 based on the sensed luminance of the ambient light. The ambient light sensor 180L may be further configured to automatically adjust white balance during photographing. The ambient light sensor 180L may further cooperate with the optical proximity sensor 180G, to detect whether the mobile phone 100 is in a pocket, to prevent touch made by mistake.

The fingerprint sensor 180H is configured to collect a fingerprint. The mobile phone 100 may implement fingerprint unlock, application access lock, fingerprint photographing, call answering using a fingerprint, and the like by using a collected fingerprint feature.

The temperature sensor 180J is configured to detect a temperature. In some embodiments, the mobile phone 100 executes a temperature processing policy by using the temperature detected by the temperature sensor 180J. For example, when the temperature reported by the temperature sensor 180J exceeds a threshold, the mobile phone 100 reduces performance of a processor located near the temperature sensor 180J, to reduce power consumption and implement overheat protection. In some other embodiments, when the temperature is lower than another threshold, the mobile phone 100 heats the battery 142, to avoid abnormal shutdown of the mobile phone 100 caused due to a low temperature. In some other embodiments, when the temperature is lower than still another threshold, the mobile phone 100 increases an output voltage of the battery 142, to avoid abnormal shutdown caused due to a low temperature.

The touch sensor 180K is also referred to as a "touch panel". The touch sensor 180K may be disposed in the display 194, and the touch sensor 180K and the display 194 form a touchscreen, also referred to as a "touch panel". The touch sensor 180K is configured to detect a touch operation on or near the display. The touch sensor may transmit the detected touch operation to the application processor, to determine a touch event type. The touch sensor may provide, through the display 194, visual output related to the touch operation. In some other embodiments, the touch sensor 180K may be alternatively disposed on a surface of the mobile phone 100, and is located on a position different from that of the display 194.

In addition, the mobile phone 100 may implement an audio function, for example, music playback or recording, by using the audio module 170, the loudspeaker 170A, the telephone receiver 170B, the microphone 170C, the headset jack 170D, the application processor, and the like. The mobile phone 100 may receive input of the button 190, and generate button signal input related to user setting and function control of the mobile phone 100. The mobile phone 100 may generate a vibration alert (for example, a calling vibration alert) by using the motor 191. The indicator 192 of the mobile phone 100 may be an indicator light, may be configured to indicate a charging state and a battery level change, and may be further configured to indicate a message, a missed call, a notification, and the like. The SIM card interface 195 of the mobile phone 100 is configured to connect to a SIM card. The SIM card may be inserted into the SIM card interface 195, or removed from the SIM card interface 195, to contact or be separated from the mobile phone 100.

A wireless communication function of the mobile phone 100 may be implemented by using the antenna 1, the antenna 2, the mobile communication module 150, the wireless communication module 160, the modem processor, and the baseband processor.

The antenna 1 and the antenna 2 are configured to transmit and receive electromagnetic wave signals. Each antenna of the electronic device 100 may be configured to cover a single communication frequency band or a plurality of communication frequency bands. Different antennas may be reused, to improve utilization of the antennas. For example, the antenna 1 may be reused as a diversity antenna of a wireless local area network. In some other embodiments, the antenna may be combined with a tuning switch for use.

The mobile communication module 150 may provide a solution of wireless communication applied to the electronic device 100, for example, 2G/3G/4G/5G. The mobile communication module 150 may include at least one filter, a switch, a power amplifier, a low noise amplifier (LNA), and the like. The mobile communication module 150 may receive an electromagnetic wave through the antenna 1, perform processing such as filtering and amplification on the received electromagnetic wave, and transmit the processed electromagnetic wave to the modem processor for demodulation. The mobile communication module 150 may further amplify a signal modulated by the modem processor, and convert the signal into an electromagnetic wave and radiate the electromagnetic wave through the antenna 1. In some embodiments, at least some function modules of the mobile communication module 150 may be disposed in the processor 110. In some embodiments, at least some function modules of the mobile communication module 150 may be disposed in a same component as at least some modules of the processor 110.

The modem processor may include a modulator and a demodulator. The modulator is configured to modulate a to-be-sent low-frequency baseband signal into an intermediate-and-high-frequency signal. The demodulator is configured to demodulate a received electromagnetic wave signal into a low-frequency baseband signal. Subsequently, the demodulator transmits the low-frequency baseband signal obtained through demodulation to the baseband processor for processing. The low-frequency baseband signal is transmitted to the application processor after being processed by the baseband processor. The application processor outputs a voice signal through an audio device (which is not limited to the loudspeaker 170A and the telephone receiver 170B), or displays an image or a video through the display 194. In some embodiments, the modem processor may be an independent component. In some other embodiments, the modem processor may be independent of the processor 110, and may be disposed in a same component as the mobile communication module 150 or another function module.

The wireless communication module 160 may provide a solution of wireless communication applied to the electronic device 100, for example, a wireless local area network (WLAN) (for example, a wireless fidelity (Wi-Fi) network), Bluetooth (BT), a global navigation satellite system (GNSS), frequency modulation (FM), a near field wireless communication technology (NFC), and an infrared technology (IR). The wireless communication module 160 may be one or more components integrated with at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave and radiate the electromagnetic wave through the antenna 2.

The following embodiments can be implemented in a terminal device (for example, the mobile phone 100 or a tablet computer) having the foregoing hardware structure.

For the convenience of describing the image capturing algorithm provided in the embodiments of this application, the following introduces, by using components related to the image capturing algorithm provided in the embodiments of this application, the image capturing algorithm provided in the embodiments of this application. For details, refer to FIG. 2. For components shown in FIG. 2, refer to related descriptions in FIG. 1. It should be noted that in FIG. 2, that the processor 110 is integrated with a GPU 110-1, an ISP 110-2, and an NPU 110-3 is used as an example.

Figure 2:
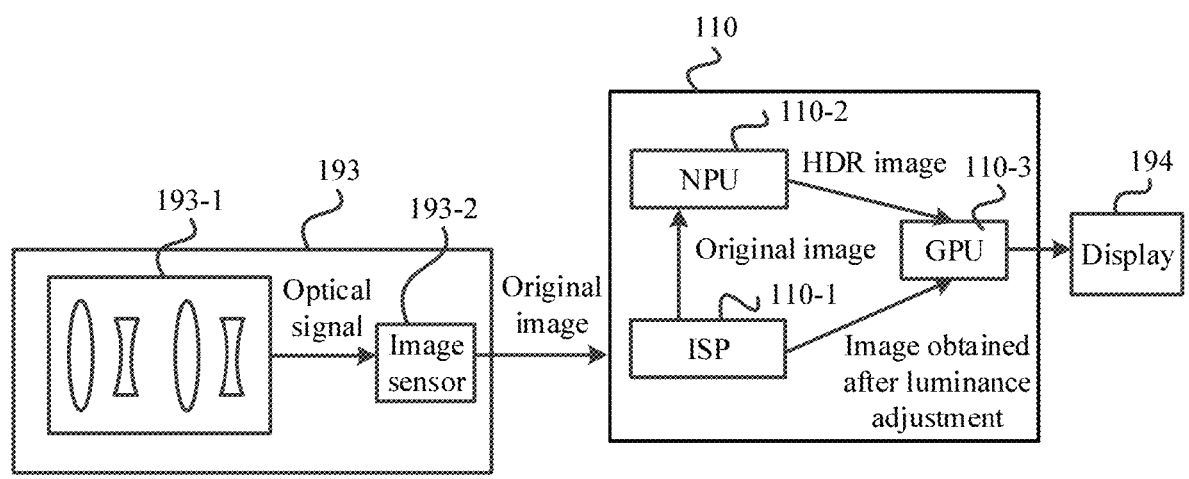
FIG. 2 is a schematic structural diagram of a mobile phone 100 according to an embodiment of this application.
Figure 3:
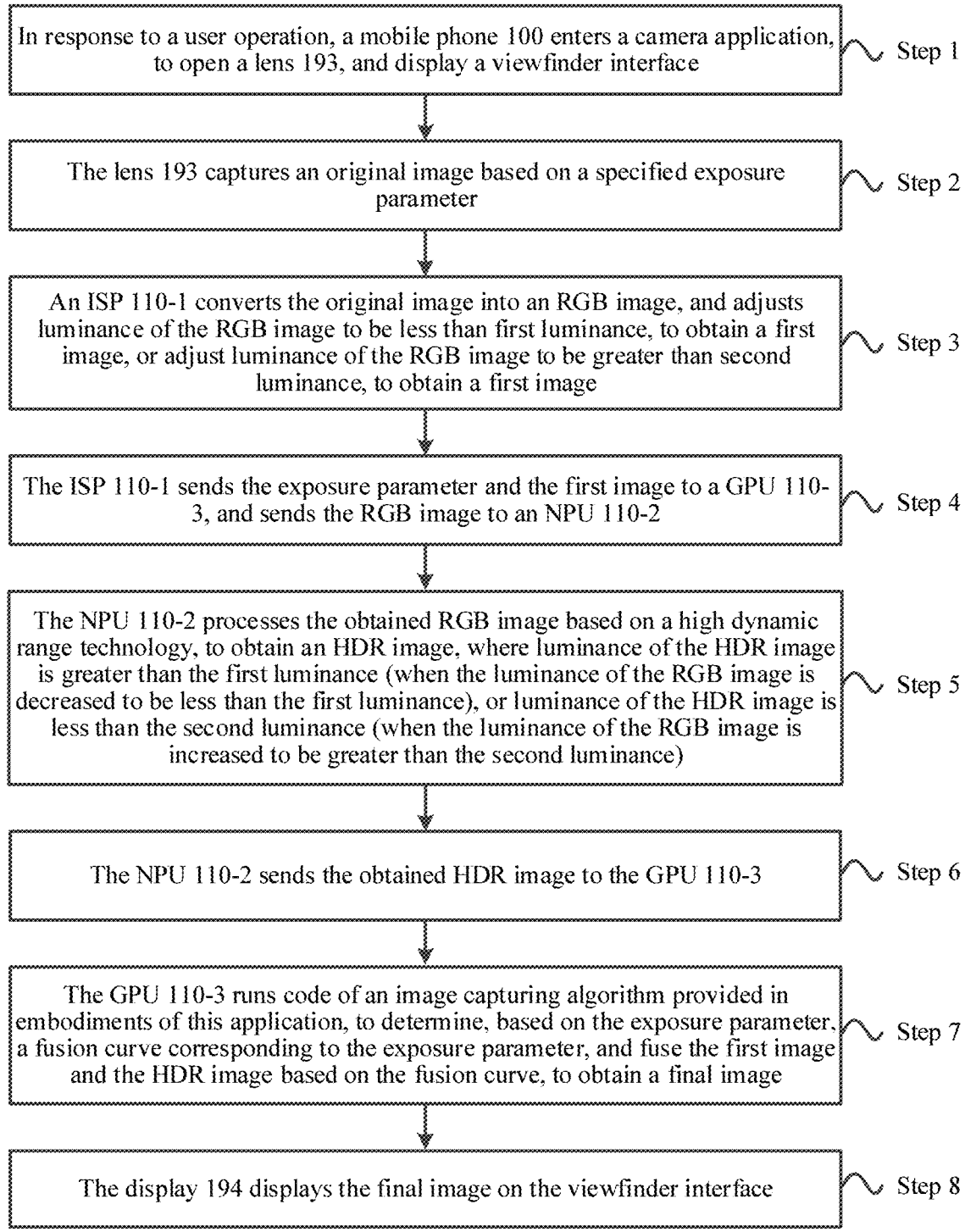
FIG. 3 is a schematic flowchart of capturing an image by using a mobile phone 100 according to an embodiment of this application.

The following introduces a process of capturing an image by using the mobile phone 100 shown in FIG. 2. FIG. 3 is a schematic diagram of the process of capturing an image by using the mobile phone 100 according to an embodiment of this application. As shown in FIG. 3, the process includes the following steps.

Step 1. In response to a user operation, the mobile phone 100 enters a camera application, to open a lens 193, and display a viewfinder interface.

For example, the display 194 of the mobile phone 100 displays a main interface. The main interface includes icons of various applications (for example, an icon of a phone application, an icon of a video player, an icon of a music player, an icon of a camera application, and an icon of a browser application). A user taps the icon of the camera application on the main interface by using the touch sensor 180K (which is not shown in FIG. 2, for the touch sensor 180K, refer to FIG. 1) disposed on the display 194, to start the camera application, and open the lens 193. The display 194 displays an interface of the camera application, for example, the viewfinder interface.

Step 2. The lens 193 captures an original image based on a specified exposure parameter.

Specifically, referring to FIG. 2, a process of capturing, by the lens 193, the original image is: A lens group 193-1 in the lens 193 collects an optical signal reflected by a to-be-photographed object, and transmits the collected optical signal to an image sensor 193-2. The image sensor 193-2 generates the original image of the to-be-photographed object based on the optical signal.

It should be noted that before the lens 193 captures the original image, generally, a lens parameter is set, for example, a value of the exposure parameter (which may be customized by the user, or may be set by the mobile phone 100). The exposure parameter includes at least one of the following plurality of parameters: ISO, exposure time, an aperture, a shutter, an intake light amount, and the like, or the exposure parameter may be another parameter that is calculated based on IOS, aperture, and a shutter and that is used to indicate an exposure degree, provided that the exposure degree can be reflected. This is not limited in this embodiment of this application.

The original image captured by the lens 193 is an original image that is not processed. For example, the original image may be data in a raw format, and the data in the raw format includes information about the to-be-photographed object and the lens parameter (for example, the exposure parameter).

Step 3. An ISP 110-1 converts the original image into an RGB image. Generally, when the exposure parameter is set to be relatively high, luminance of the original image that is captured by the lens 193 based on the specified exposure parameter is relatively high, and in this case, the ISP 110-1 may adjust luminance of the RGB image to be less than first luminance, to obtain a first image; or when the exposure parameter is set to be relatively low, luminance of the original image that is captured by the lens 193 based on the specified exposure parameter is relatively low, and in this case, the ISP 110-1 may adjust luminance of the RGB image to be greater than second luminance, to obtain a first image. Values of the first luminance and the second luminance may be preset, and the first luminance is greater than or equal to the second luminance.

As can be learned from the foregoing content, the original image includes the information about the to-be-photographed object and the lens parameter. Because the original image captured by the lens 193 is an image that is not processed, the ISP 110-1 may process the original image based on an RGB color mode, to obtain an image including color information, namely, the RGB image. That the original image captured by the lens 193 is data in a raw format is used as an example. The ISP 110-1 may convert the data in the raw format into data in an RGB format based on the RGB color mode. The data in the RGB format is data including color information. For a process of converting, by the SP 110-1, the data in the raw format into the data in the RGB format based on the RGB color mode, refer to the prior art. This is not limited in this embodiment of this application. Specifically, a luminance value to which the ISP 110-1 adjusts the RGB image may be set based on setting of the user. Only the first luminance and the second luminance are used as an example for description herein.

Certainly, the ISP 110-1 may further convert, based on a YUV color mode, the data in the raw format into a YUV image including color information. This is not limited in this embodiment of this application.

Step 4. The ISP 110-1 sends the exposure parameter and the first image to a GPU 110-3, and sends the RGB image to an NPU 110-2.

Step 5. The NPU 110-2 processes the obtained RGB image based on a high dynamic range technology, to obtain an HDR image. Specifically, when the ISP 110-1 adjusts the luminance of the RGB image to be less than the first luminance, the NPU 110-2 may increase luminance of the HDR image to be greater than the first luminance based on the high dynamic range technology. When the ISP 110-1 adjusts the luminance of the RGB image to be greater than the second luminance, the NPU 110-2 may decrease the luminance of the HDR image to be less than the second luminance based on the high dynamic range technology.

For the high dynamic range technology, refer to the prior art. This is not limited in this embodiment of this application.

Step 6. The NPU 110-2 sends the obtained HDR image to the GPU 110-3.

Step 7. The GPU 110-3 runs code of the image capturing algorithm provided in the embodiments of this application, to determine, based on the exposure parameter, a fusion curve corresponding to the exposure parameter, and fuse the first image and the HDR image based on the fusion curve, to obtain a final image.

Figure 4:
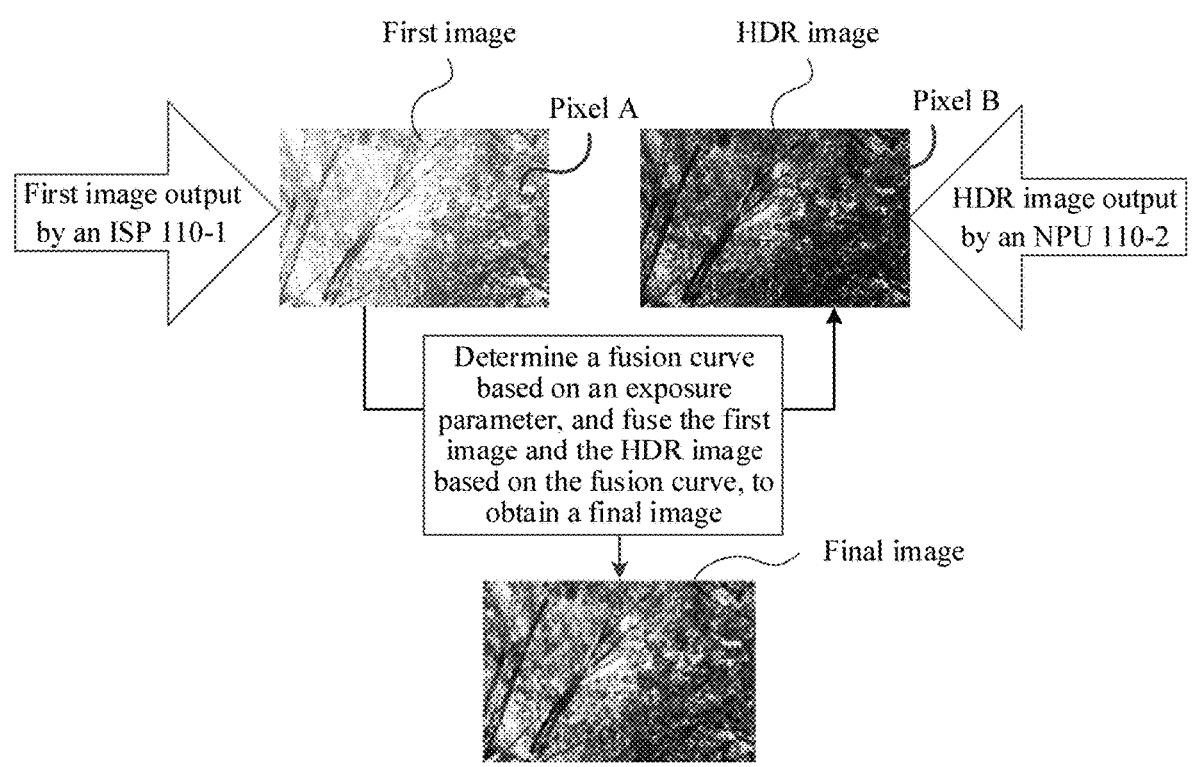
FIG. 4 is a schematic effect diagram of an image capturing method according to an embodiment of this application.

FIG. 4 is a schematic diagram of fusing, by the GPU 110-3, the first image and the HDR image. As shown in FIG. 4, the GPU 110-3 determines the fusion curve based on the exposure parameter, and fuses the first image and the HDR image based on the fusion curve, to obtain the final image. It should be noted that as can be learned from the foregoing content, inappropriate adjustment on the exposure parameter affects information about details of an image. For example, in a case of overexposure, an image is too bright, leading to a fact that details on a bright part are clear but details on a dark part are lost; in a case of underexposure, an image is too dark, leading to a fact that details on a dark part of the image are clear but details on a bright part are lost.

Therefore, in some embodiments of this application, when the value of the exposure parameter is set to be relatively high, the ISP 110-1 may decrease the luminance of the GRB image, that is, luminance of the first image is relatively low (in this way, details on a dark part of the first image are maintained). The NPU 110-2 increases the luminance of the RGB image by using the high dynamic range technology, to obtain the HDR image, to restore details on a bright part of the HDR image (in this way, the details on the bright part of the HDR image are maintained). The GPU 110-3 fuses the first image and the HDR image, that is, fuses the details on the dark part of the first image and the details on the bright part of the HDR image, to obtain the final image having relatively high image quality.

In some other embodiments of this application, when the value of the exposure parameter is set to be relatively low, the ISP 110-1 may increase the luminance of the GRB image, that is, luminance of the first image is relatively high (in this way, details on a bright part of the first image are maintained). The NPU 110-2 decreases the luminance of the RGB image by using the high dynamic range technology, to obtain the HDR image, to restore details on a dark part of the HDR image (in this way, the details on the dark part of the HDR image are maintained). The GPU 110-3 fuses the first image and the HDR image, that is, fuses the details on the bright part of the first image and the details on the dark part of the HDR image, to obtain the final image having relatively high image quality.

The ISP 110-1 may compare the value of the exposure parameter in the original image with a pre-stored value of an exposure parameter, and if the value of the exposure parameter in the original image is greater than the pre-stored value of the exposure parameter, determine that the value of the exposure parameter is relatively high, or if the value of the exposure parameter in the original image is less than or equal to the pre-stored value of the exposure parameter, determine that the value of the exposure parameter is relatively low.

Other descriptions of a specific implementation process of step 7 are described below.

Step 8. The display 194 displays the final image on the viewfinder interface.

It should be noted that in FIG. 2, that the processor 110 is integrated with the GPU 110-1, the ISP 110-2, and the NPU 110-3 is used as an example. In an actual application, the processor 110 may be integrated only with one or more of the GPU 110-1, the ISP 110-2, and the NPU 110-3. Assuming that the processor 110 is integrated only with the GPU 110-1 and the ISP 110-2, a function of the NPU 110-3 (a function of obtaining the HDR image based on the original image) in the foregoing embodiment may be performed by the GPU 110-1 or the ISP 110-2. Then, assuming that the processor 110 is integrated only with the NPU 110-3 and the ISP 110-2, the function of the GPU 110-1 (a function of running the image capturing algorithm provided in the embodiments of this application to fuse the first image and the HDR image) in the foregoing embodiment may be performed by the NPU 110-3 or the ISP 110-2. In addition, the processor 110 in FIG. 2 may be further integrated only with a processor, for example, a central processing unit CPU, other than the GPU 110-1, the ISP 110-2, and the NPU 110-3, and then, functions of the GPU 110-1, the ISP 110-2, and the NPU 110-3 are performed by the CPU. Alternatively, the processor 110 in FIG. 2 may be integrated with the CPU, the ISP 110-2, and the NPU 110-3, and then, the function of the GPU 110-1 is performed by the CPU. In conclusion, the image capturing algorithm in the embodiments of this application may be run in various types of processors. This is not limited in this embodiment of this application.

The process shown in FIG. 3 uses an example in which an image is captured by using the camera application of the mobile phone 100. Actually, the image capturing method provided in this embodiment of this application may be further applied to another scenario, for example, a scenario of capturing an image by using a lens such as a scenario of a video call of a WeChat application or a scenario of a QQ video call in the mobile phone 100.

Figure 5:
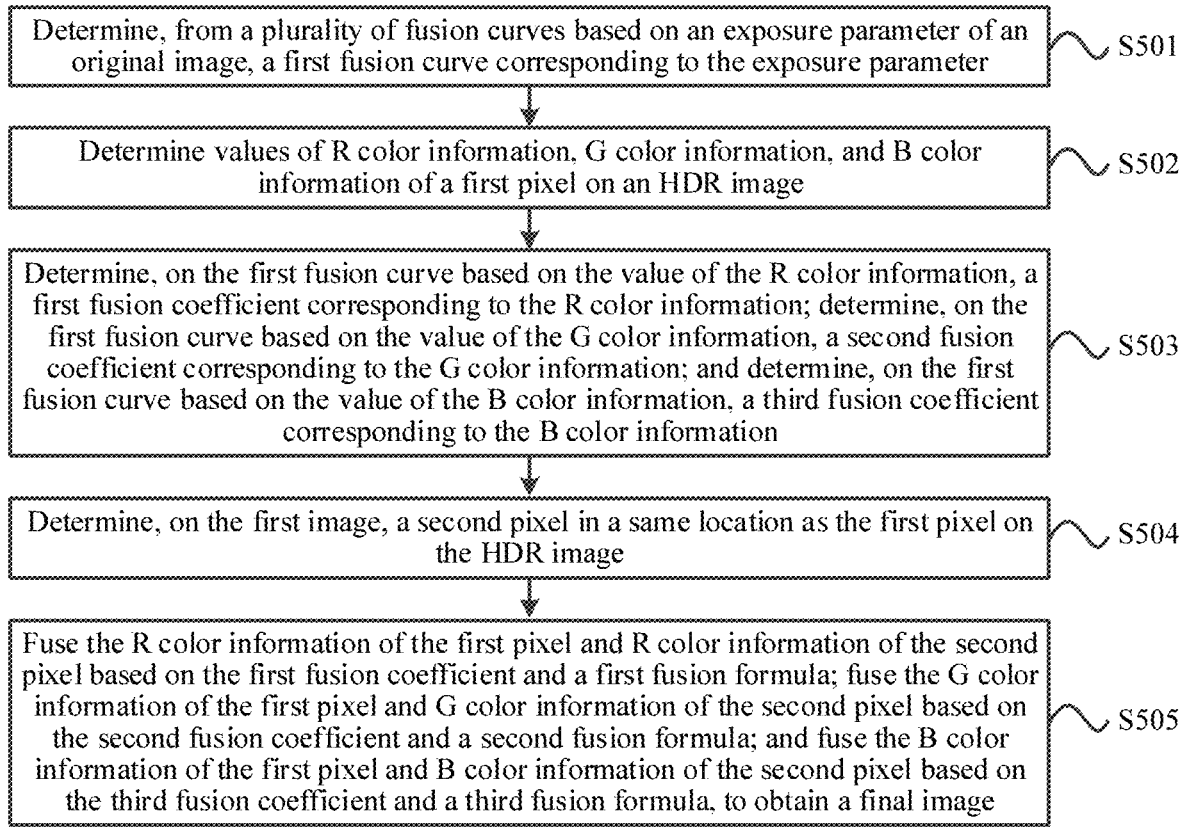
FIG. 5 is a schematic flowchart of an image capturing method according to an embodiment of this application.

The following describes a process of running, by the GPU 110-3 of the mobile phone 100, the image capturing method provided in this embodiment of this application, to determine, based on the exposure parameter, the fusion curve corresponding to the exposure parameter, and fuse the first image and the HDR image based on the fusion curve, to obtain the final image, namely, the process of step 7 in FIG. 3. Specifically, as shown in FIG. 5, the GPU 110-3 runs the code of the image capturing algorithm provided in the embodiments of this application, to perform the following process:

S501. Determine, from a plurality of fusion curves based on the exposure parameter of the original image, a first fusion curve corresponding to the exposure parameter.

In an example, the mobile phone 100 may pre-store the plurality of fusion curves. The fusion curves may be obtained by a designer through experiment before delivery of the mobile phone 100, and stored in the mobile phone 100 (for example, the internal memory 121).

Figure 6:
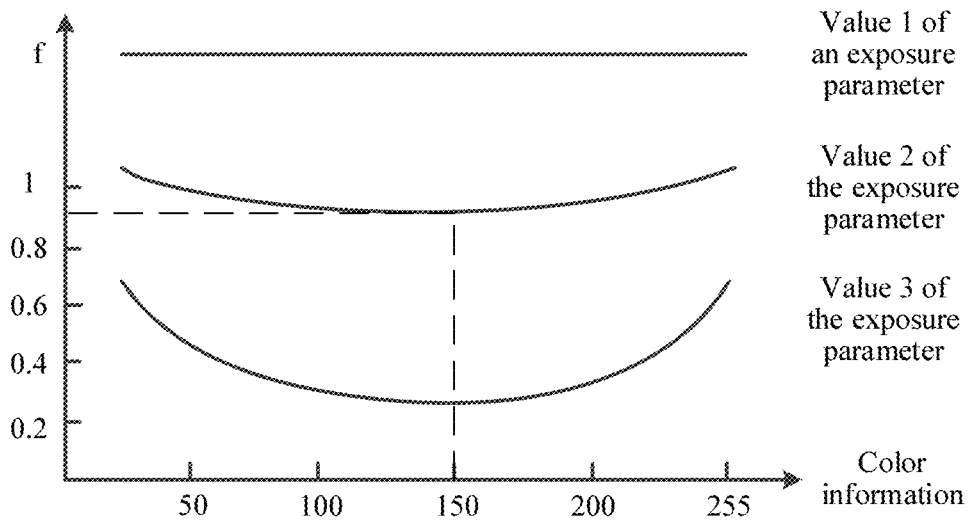
FIG. 6 is a schematic diagram of fusion curves according to an embodiment of this application.

FIG. 6 is a schematic diagram of fusion curves according to an embodiment of this application. As shown in FIG. 6, a horizontal axis represents color information (for example, values of R color information, G color information, and B color information) and a longitudinal axis represents a fusion coefficient. One fusion curve is used as an example. The fusion curve may reflect a correspondence between a fusion coefficient and a value of R color information (G color information or B color information).

It is assumed that the value of the exposure parameter is 1. The GPU 110-3 determines, from the plurality of fusion curves in FIG. 6 based on the value 1 of the exposure parameter, a first fusion curve corresponding to the value 1.

It should be noted that three fusion curves are used as an example in FIG. 6. In an actual application, the mobile phone 100 may include more fusion curves.

In an example, when determining that the exposure parameter is less than a first exposure parameter (for example, a value of the first exposure parameter is a value 1), the GPU 110-3 determines a first fusion curve (for example, a fusion curve corresponding to an exposure parameter whose value is 1 in FIG. 6); when determining that the exposure parameter is greater than or equal to the first exposure parameter and less than a second exposure parameter (for example, a value of the second exposure parameter is a value 2), the GPU 110-3 determines a second fusion curve (for example, a fusion curve corresponding to an exposure parameter whose value is 2 in FIG. 6); or when determining that the exposure parameter is greater than or equal to the second exposure parameter and less than a third exposure parameter (for example, a value of the third exposure parameter is a value 3), the GPU 110-3 determines a third fusion curve (for example, a fusion curve corresponding to an exposure parameter whose value is 3 in FIG. 6). In this manner, the mobile phone 100 does not need to store many fusion curves, to save storage space.

In another example, the exposure parameter is in a one-to-one correspondence to the fusion curve. In other words, one different fusion curve may be determined based on each exposure parameter. In this manner, the mobile phone 100 stores relatively many fusion curves, and a fusion curve determined based on an exposure parameter is relatively accurate.

S502. Determine values of R color information, G color information, and B color information of a first pixel on the HDR image.

As can be learned from the foregoing content, the ISP 110-1 processes the original image to obtain the RGB image including the color information, and then adjusts the luminance of the RGB image to obtain the first image. Therefore, for step S502, refer to the prior art. Details are not described in this embodiment of this application.

S503. Determine, on the first fusion curve based on the value of the R color information, a first fusion coefficient corresponding to the R color information; determine, on the first fusion curve based on the value of the G color information, a second fusion coefficient corresponding to the G color information; and determine, on the first fusion curve based on the value of the B color information, a third fusion coefficient corresponding to the B color information.

For example, it is assumed that the value of the R color information is 150, and that in S501, the GPU 110-1 determines that the first fusion curve is a fusion curve corresponding to the exposure parameter whose value is 2 in FIG. 6. Then, the GPU 110-1 finds a value 150 of R color information on the horizontal axis, and determines a longitudinal coordinate corresponding to the value 150 on the first fusion curve, that is, the longitudinal coordinate is the first fusion coefficient. A similar manner may be used for the G color information and the B color information. Details are not described.

It should be noted that fusion coefficients corresponding to the R color information, the G color information, and the B color information may be determined by using the fusion curves shown in FIG. 6. In other words, horizontal coordinates in FIG. 6 may represent the values of the R color information, the G color information, and the B color information. Alternatively, horizontal coordinates of the fusion curves in FIG. 6 only represent correspondences between R color information and a fusion coefficient, and a designer may design, for each of the G color information and the B color information, a group of fusion curves similar to those shown in FIG. 6.

S504. Determine, on the first image, a second pixel in a same location as the first pixel on the HDR image.

Because both the first image and the HDR image are obtained based on the original image, and coordinate points on the original image can be determined on an imaging plane, the GPU 110-3 may determine coordinate values of each pixel on the first image and the HDR image. FIG. 4 is used as an example, and FIG. 4 shows one frame of HDR image and one frame of first image. The GPU 110-3 may select a pixel B (namely, the first pixel) on the HDR image. The GPU 110-3 may obtain, based on a matching algorithm (for example, a similarity matching algorithm) in the prior art, a pixel A (namely, the second pixel) that corresponds to the pixel B and that is on the first image. Alternatively, the GPU 110-3 may determine pixels in a same location (having same coordinate values) on the first image and the HDR image.

S505. Fuse the R color information of the first pixel and R color information of the second pixel based on the first fusion coefficient and a first fusion formula; fuse the G color information of the first pixel and G color information of the second pixel based on the second fusion coefficient and a second fusion formula; and fuse the B color information of the first pixel and B color information of the second pixel based on the third fusion coefficient and a third fusion formula, to obtain the final image.

As can be learned from the foregoing content, each pixel on a frame of image includes three types of color information, namely, R color information, G color information, and B color information, and for the pixels, values of the R color information are different, values of the G color information are different, and values of the B color information are different. Therefore, in this embodiment of this application, when fusing the first image and the HDR image, the GPU 110-3 may fuse color information of pixels on the two frames of images.

FIG. 4 is still used as an example. After determining the pixel A and the pixel B, the GPU 110-3 may respectively fuse the R color information, the G color information, and the B color information of the pixel A and the R color information, the G color information, and the B color information of the pixel B. Specifically, the GPU 110-3 fuses the R color information of the pixel A and the R color information of the pixel B, fuses the G color information of the pixel A and the G color information of the pixel B, and fuses the B color information of the pixel A and the B color information of the pixel B.

R color information is used as an example. The GPU 110-3 may fuse the R color information of the pixel A and the R color information of the pixel B based on the first fusion formula and the first fusion coefficient (the first fusion coefficient determined in S503).

In an example, the mobile phone 100 may store the first fusion formula (a fusion formula used to calculate R color information of a pixel on the final image), referring to formula (1):

$$R_{dst}=(1-f1)\cdot R_{src}+f1\cdot R_{res} \qquad \text{formula (1), where}$$

$R_{src}$ is a value of R color information of a pixel (for example, the pixel A) on the first image, $R_{res}$ is a value of R color information of a pixel (for example, the pixel B) on the HDR image, and f1 is a first fusion coefficient (step S503) determined on the first fusion curve based on the value of the R color information of the pixel (for example, the pixel B) on the HDR image. A value, namely, $R_{dst}$, of R color information of a pixel (for example, a pixel C) on the final image is obtained by using the formula (1).

In an example, the mobile phone 100 may store the second fusion formula (a fusion formula used to calculate G color information of a pixel on the final image), referring to formula (2):

$$G_{dst}=(1-f2)\cdot G_{src}+f2\cdot G_{res} \qquad \text{formula (2), where}$$

$G_{src}$ is a value of G color information of the pixel (for example, the pixel A) on the first image, $G_{res}$ is a value of G color information of the pixel (for example, the pixel B) on the HDR image, and f2 is a second fusion coefficient (step S503) determined on the first fusion curve based on the value of the G color information of the pixel (for example, the pixel B) on the HDR image. A value, namely, $G_{dst}$, of G color information of the pixel (for example, the pixel C) on the final image is obtained by using the formula (2).

In an example, the mobile phone 100 may store the third fusion formula (a fusion formula used to calculate B color information of a pixel on the image obtained after fusion), referring to formula (3):

$$B_{dst}=(1-f3)\cdot B_{src}+f3\cdot B_{res} \quad \text{formula (3), where}$$

$B_{src}$ is a value of B color information of the pixel (for example, the pixel A) on the first image, $B_{res}$ is a value of B color information of the pixel (for example, the pixel B) on the HDR image, and f3 is a third fusion coefficient (step S503) determined on the first fusion curve based on the value of the B color information of the pixel (for example, the pixel B) on the HDR image. A value, namely, $B_{dst}$, of B color information of the pixel (for example, the pixel C) on the final image is obtained by using the formula (3).

The R color information, the G color information, and the B color information of the pixel (namely, the pixel C) on the image obtained after fusion can be determined by using the foregoing formulas (1) to (3). A similar manner may be used for the other pixel, to finally determine R color information, G color information, and B color information of each pixel to obtain the final image.

It should be noted that a sequence of performing S501 to S505 in the embodiment shown in FIG. 5 is not limited in this embodiment of this application.

In the foregoing embodiment, the GPU 110-1 fuses the first image and the HDR image to obtain the final image. The following introduces another embodiment. In this embodiment, the NPU 110-2 may perform different luminance adjustment on different regions of the RGB image, to obtain a plurality of frames of HDR images. In other words, in step 5 in the process shown in FIG. 3, the NPU 110-2 performs different luminance adjustment on different regions of the RGB image, to obtain the plurality of frames of HDR images. The NPU 110-2 sends the obtained plurality of frames of HDR images to the GPU 110-3. The GPU 110-3 fuses the plurality of frames of HDR images and the first image to obtain the final image (corresponding to step 7 in FIG. 3).

Figure 7:
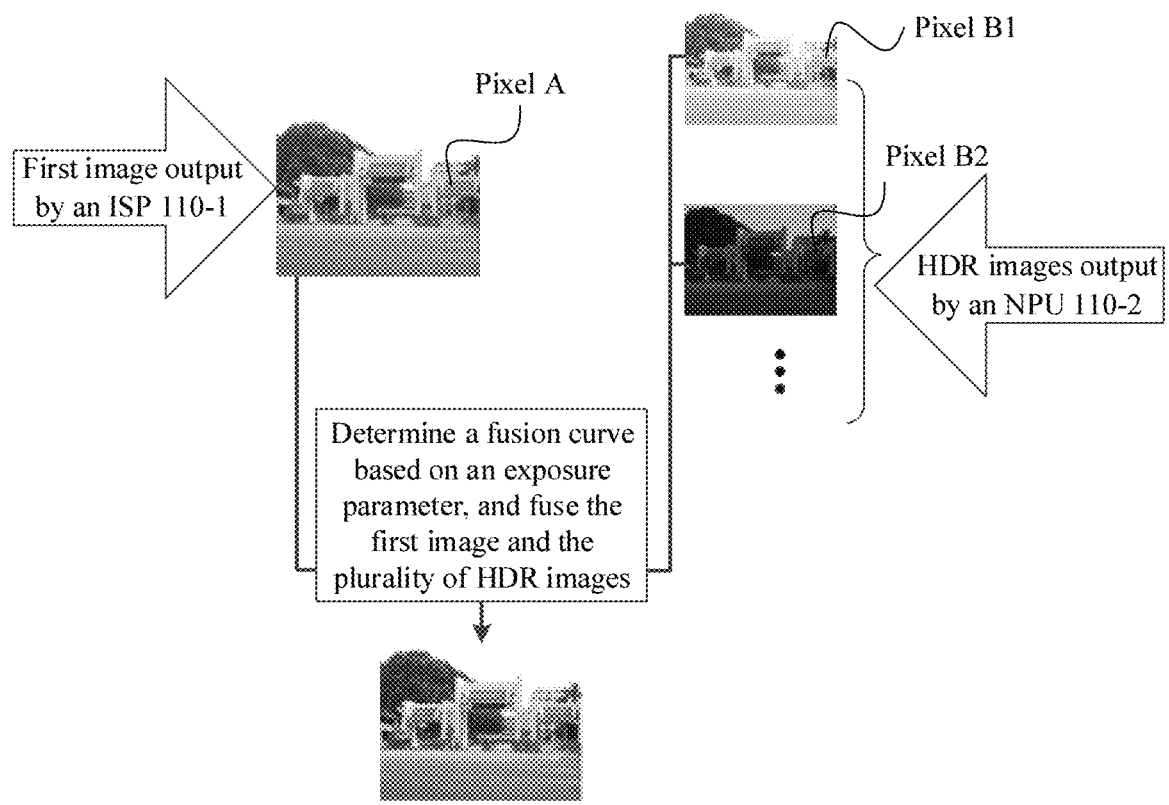
FIG. 7 is a schematic flowchart of an image capturing method according to an embodiment of this application.

FIG. 7 is a schematic flowchart of an image capturing process according to an embodiment of this application. As shown in FIG. 7, the GPU 110-3 determines the fusion curve based on the exposure parameter, and fuses the first image and the plurality of frames of HDR images based on the fusion curve, to obtain the final image. The NPU 110-2 uses a high dynamic range technology for different regions of the RGB image, to obtain the plurality of frames of HDR images. Two frames of HDR images are used as an example. When the ISP 110-1 adjusts the luminance of the RGB image to be less than the first luminance, the NPU 110-2 may increase, based on the high dynamic range technology, luminance of a first region (a complete region or a partial region) of the RGB image to a luminance value greater than the first luminance, to obtain one frame of HDR image, and the NPU 110-2 may increase, based on the high dynamic range technology, luminance of a second region (a complete region or a partial region) of the RGB image to another luminance value greater than the first luminance, to obtain another frame of HDR image. When the ISP 110-1 adjusts the luminance of the RGB image to be greater than the second luminance, the NPU 110-2 may decrease, based on the high dynamic range technology, luminance of a first region (a complete region or a partial region) of the RGB image to a luminance value less than the second luminance, to obtain one frame of HDR image, and the NPU 110-2 may decrease, based on the high dynamic range technology, luminance of a second region (a complete region or a partial region) of the RGB image to another luminance value less than the second luminance, to obtain another frame of HDR image. In conclusion, luminance of the plurality of frames of HDR images obtained by the NPU 110-2 may be different. In this way, details on different regions of the plurality of frames of HDR images obtained by the NPU 110-2 are different. The GPU 110-3 may fuse the first image and the plurality of frames of HDR images to obtain the final image.

It should be noted that a process of fusing, by the GPU 110-3, the plurality of frames of HDR images and the first image is similar to the process shown in FIG. 4. A difference is as follows: In S404, the GPU 110-3 determines second pixels (for example, a pixel B1 and a pixel B2) that correspond to the first pixel (for example, the pixel A) on the first image and that are on the plurality of frames of HDR images. In S405, fusion formulas used by the GPU 110-3 are different.

R color information is used as an example. A fusion formula used to calculate R color information of a pixel on the final image is different from the foregoing formula (1). For details, refer to formula (4):

$$R_{dst}=(1-\Sigma_{i=1}^{n}f_i)\cdot R_{src}+\Sigma_{i=1}^{n}f_i\cdot R_{res}^{i} \quad \text{formula (4), where}$$

$R_{src}$ is a value of R color information of a pixel (for example, the pixel A) on the first image, $R_{res}^{i}$ is a value of R color information of a pixel on an $i^{th}$ frame of HDR image (for example, $R_{res}^{1}$ is a value of R color information of a pixel B1 on a first frame of HDR image, $R_{res}^{2}$ is a value of R color information of a pixel B2 on a second frame of HDR image, and so on), and n is a quantity of HDR images obtained by the NPU 110-2 (when n is equal to 1, the NPU 110-2 obtains one frame of HDR image, which corresponds to the embodiment shown in FIG. 4). $f_i$ is a fusion coefficient determined on the first fusion curve based on the value (namely, $R_{res}^{i}$) of the R color information of the pixel on the $i^{th}$ frame of HDR image (for example, $f_1$ is a fusion coefficient determined on the first fusion curve based on the value, namely, $R_{res}^{1}$, of the R color information of the pixel B1 on the first frame of HDR image, $f_2$ is a fusion coefficient determined on the first fusion curve based on the value, namely, $R_{res}^{2}$, of the R color information of the pixel B2 on the second frame of HDR image, and so on).

A value, namely, $G_{dst}$, of G color information of a pixel (for example, a pixel C) on the final image is obtained by using formula (5).

G color information is used as an example. A fusion formula used to calculate the G color information of the pixel on the final image is different from the foregoing formula (2). For details, refer to formula (5):

$$G_{dst}=(1-\Sigma_{i=1}^{n}f_i)\cdot G_{src}+\Sigma_{i=1}^{n}f_i\cdot G_{res}^{i} \quad \text{formula (5), where}$$

$G_{src}$ is a value of G color information of the pixel (for example, the pixel A) on the first image, $G_{res}^{i}$ in formula (5) is a value of G color information of the pixel on the $i^{th}$ frame of HDR image (for example, $G_{res}^{1}$ is a value of G color information of the pixel B1 on the first frame of HDR image, $G_{res}^{2}$ is a value of G color information of the pixel B2 on the second frame of HDR image, and so on), and n is a quantity of frames of HDR images obtained by the NPU 110-2. $f_i$ is a fusion coefficient determined on the first fusion curve based on the value (namely, $G_{res}^{i}$) of the G color information of the pixel on the $i^{th}$ frame of HDR image (for example, $f_1$ is a fusion coefficient determined on the first fusion curve based on the value, namely, $G_{res}^{1}$, of the G color information of the pixel B1 on the first frame of HDR image, $f_2$ is a fusion coefficient determined on the first fusion curve based on the value, namely, $G_{res}^2$, of the G color information of the pixel B2 on the second frame of HDR image, and so on).

The value, namely, $G_{dst}$, of the G color information of the pixel (for example, the pixel C) on the final image is obtained by using the formula (5).

B color information is used as an example. A fusion formula used to calculate B color information of a pixel on the final image is different from the foregoing formula (3). For details, refer to formula (6):

$$B_{dst} = (1 - \Sigma_{i=1}^n f_i) \cdot B_{src} + \Sigma_{i=1}^n f_i \cdot B_{res}^i \qquad \text{formula (6), where}$$

$B_{src}$ is a value of B color information of the pixel (for example, the pixel A) on the first image, $B_{res}^i$ is a value of the B color information of the pixel on the $i^{th}$ frame of HDR image (for example, $B_{res}^i$ is a value of B color information of the pixel B1 on the first frame of HDR image, $B_{res}^2$ is a value of B color information of the pixel B2 on the second frame of HDR image, and so on), and n is a quantity of frames of HDR images obtained by the NPU 110-2. $f_i$ is a fusion coefficient determined on the first fusion curve based on the value (namely, $B_{res}^i$) of the B color information of the pixel on the $i^{th}$ frame of HDR image (for example, $f_1$ is a fusion coefficient determined on the first fusion curve based on the value, namely, $B_{res}^1$, of the B color information of the pixel B1 on the first frame of HDR image, $f_2$ is a fusion coefficient determined on the first fusion curve based on the value, namely, $B_{res}^2$, of the B color information of the pixel B2 on the second frame of HDR image, and so on).

A value, namely, $B_{dst}$, of B color information of the pixel (for example, the pixel C) on the final image is obtained by using the formula (6).

The R color information, the G color information, and the B color information of the pixel (namely, the pixel C) on the image obtained after fusion can be determined by using the foregoing formulas (4) to (6). A similar manner may be used for the other pixel, to finally determine R color information, G color information, and B color information of each pixel.

The embodiments of this application may be combined in any manner, to achieve different technical effects.

In the embodiments provided in this application, the method provided in the embodiments of this application is described by using the terminal device (the mobile phone 100) as an execution body. To implement the functions of the method provided in the embodiments of this application, the terminal may include a hardware structure and/or a software module, to implement the foregoing functions in a form of the hardware structure, the software module, or the hardware structure plus the software module. Whether one of the foregoing functions is performed in a manner of the hardware structure, the software module, or the hardware structure plus the software module depends on a particular application and a design constraint condition of a technical solution.

Figure 8:
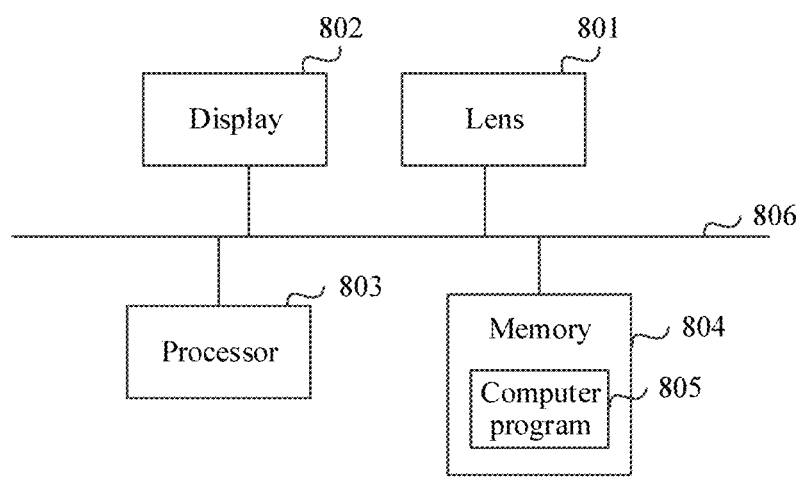
FIG. 8 is a schematic structural diagram of a terminal device according to an embodiment of this application.

Based on a same idea, FIG. 8 shows a terminal device 800 provided in this application. As shown in FIG. 8, the terminal device 800 may include a lens 801, a display 802, one or more processors 803, a memory 804, and one or more computer programs 805. The components may be connected by using one or more communication buses 806.

The lens 1402 is configured to capture an original image. The one or more computer programs 805 are stored in the memory 804 and are configured to be executed by the one or more processors 803. The one or more computer programs 805 include an instruction. The instruction may be used to perform all or some steps in FIG. 3 or FIG. 5 and various steps in a corresponding embodiment.

Figure 9:
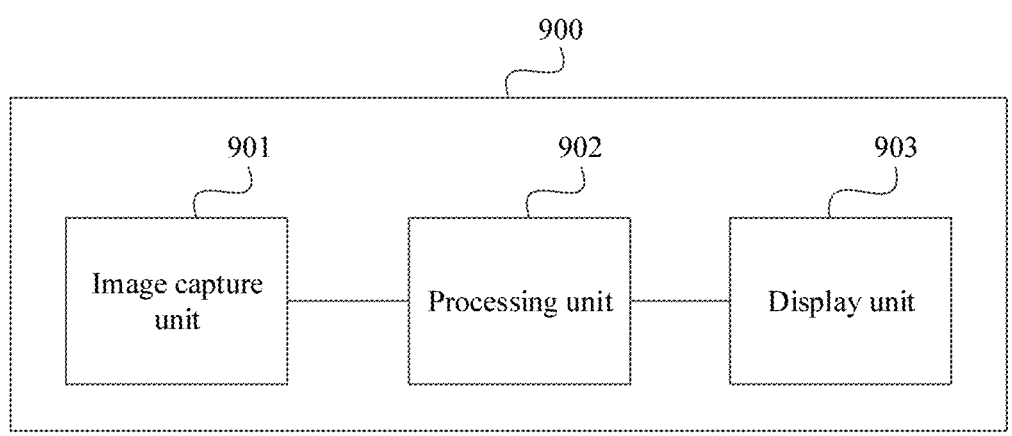
FIG. 9 is a schematic structural diagram of a terminal device according to an embodiment of this application.

Based on a same idea, FIG. 9 shows a terminal device 900 provided in this application. As shown in FIG. 9, the terminal device 900 may include an image capture unit 901, a processing unit 902, and a display unit 903.

The processing unit 902 is configured to: in response to a user operation, open a camera application to start a lens.

The display unit 903 is configured to display a viewfinder interface.

The processing unit 902 is further configured to: convert an original image captured by the lens into an RGB image; decrease luminance of the RGB image to be less than first luminance or increase luminance of the RGB image to be greater than second luminance, to obtain a first image, where the first luminance is greater than the second luminance; convert the RGB image into N frames of HDR images by using an HDR technology, where the N frames of HDR images have different luminance, and the luminance of the N frames of HDR images is greater than the first luminance when the luminance of the RGB image is decreased to be less than the first luminance, or the luminance of the N frames of HDR images is less than the second luminance when the luminance of the RGB image is increased to be greater than the second luminance, where N is a positive integer; and fuse color information of pixels in any same location on the first image and the N frames of HDR images to obtain a final image.

The display unit 903 is further configured to display the final image on the viewfinder interface.

An embodiment of the present invention further provides a computer storage medium. The storage medium may include a memory. The memory may store a program. When the program is executed, a terminal is enabled to perform all or some steps performed by a terminal and recorded in the method embodiment shown in FIG. 3 or FIG. 5.

An embodiment of the present invention further provides a computer program product. When the computer program product is run on a terminal, the terminal is enabled to perform all or some steps performed by a terminal and recorded in the method embodiment shown in FIG. 3 or FIG. 5.

Through above descriptions of the implementations, a person skilled in the art may clearly understand that the embodiments of this application may be implemented by hardware, firmware or a combination thereof. When the embodiments of this application are implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium that can be accessed by a computer. The following is used as an example but is not limited to: The computer-readable medium may include a RAM, a ROM, an electrically erasable programmable read-only memory (EEPROM), a compact disc read-only memory (CD-ROM) or another compact disc storage, a magnetic disk storage medium or another magnetic storage device, or any other medium that can be used to carry or store desired program code in a form of an instruction or a data structure and that can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. A disk and disc used by the embodiments of this application includes a compact disc (CD), a laser disc, an optical disc, a digital video disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely embodiments of this application, but is not intended to limit the protection scope of this application. Any modification, equivalent replacement, improvement, and the like made according to the disclosure of this application shall fall within the protection scope of this application.

What is claimed is:

1. An image capturing method, implemented by a terminal device, wherein the image capturing method comprises:
    opening, in response to a user operation, a camera application to start a lens of the terminal device;
    displaying a viewfinder interface of the camera application;
    capturing an original image using the lens;
    converting the original image into a red-green-blue (RGB) image;
    obtaining a first image by performing one of decreasing a first luminance value of the RGB image to be less than a second luminance value, or increasing the first luminance value of the RGB image to be greater than a third luminance value, wherein the second luminance value is greater than the third luminance value;
    converting the RGB image into a plurality of frames of high-dynamic-range (HDR) images, wherein the plurality of frames have different luminance values, and wherein the luminance values of the plurality of frames are greater than the second luminance value when the first luminance value is decreased to be less than the second luminance value, or the luminance values of the plurality of frames are less than the third luminance value when the first luminance value is increased to be greater than the third luminance value;
    obtaining a final image by fusing color information of a plurality of first pixels corresponding to a same location on the first image and the plurality of frames; and
    displaying the final image on the viewfinder interface.

2. The image capturing method of claim 1, further comprising:
    further capturing the original image using an exposure parameter;
    determining, from a plurality of fusion curves, a first fusion curve corresponding to the exposure parameter, wherein the first fusion curve indicates a correspondence between color information and a fusion coefficient;
    obtaining a plurality of second pixels on the plurality of frames of HDR images corresponding to the same location of the first pixels of the first image;
    determining from the first fusion curve, based on color information of each of the second pixels, a corresponding fusion coefficient; and
    further obtaining the final image by fusing, based on the corresponding fusion coefficient for each of the second pixels, the color information of the second pixels on the plurality of frames of HDR images and the color information of the first pixels on the first image.

3. The image capturing method of claim 2, further comprising:
    determining from the first fusion curve, based on first red (R) color information of each of the second pixels, a plurality of first fusion coefficients;
    determining from the first fusion curve, based on first green (G) color information of each of the second pixels, a plurality of second fusion coefficients;
    determining from the first fusion curve, based on first blue (B) color information of each of the second pixels, a plurality of third fusion coefficients;
    fusing, based on the first fusion coefficients, the first R color information of the second pixels on the plurality of frames of HDR images and second R color information of the first pixels of the first image;
    fusing, based on the second fusion coefficients, the first G color information of the second pixels and second G color information of the first pixels; and
    fusing, based on the third fusion coefficients, the first B color information of the second pixels and second B color information of the first pixels.

4. The image capturing method of claim 3, wherein the first R color information and the second R color information are fused according to the following equation:

$$R_{dst} = (1 - \Sigma_{i=1}^{N} f_i) \cdot R_{src} + \Sigma_{i=1}^{N} f_i \cdot R_{res}^{i},$$

wherein $R_{src}$ is a first value of the second R color information on the first image, wherein $R_{res}^{i}$ is a second value of the first R color information of a second pixel on an $i^{th}$ frame of an HDR image in the plurality of frames of HDR images, wherein N is a quantity of the frames, wherein $f_i$ is a first fusion coefficient in the first fusion coefficients that is determined on the first fusion curve based on the first value, and wherein $R_{dst}$ is a third value of third R color information of a third pixel on the final image.

5. The image capturing method of claim 3, wherein the first G color information and the second G color information are fused according to the following equation:

$$G_{dst} = (1 - \Sigma_{i=1}^{N} f_i) \cdot G_{src} + \Sigma_{i=1}^{N} f_i \cdot G_{res}^{i},$$

wherein $G_{src}$ is a first value of the second G color information on the first image, wherein $G_{res}^{i}$ is a second value of the first G color information of a second pixel on an $i^{th}$ frame of an HDR image in the plurality of frames of HDR images, wherein N is a quantity of the frames, wherein $f_i$ is a second fusion coefficient in the second fusion coefficients that is determined on the first fusion curve based on the first value, and wherein $G_{dst}$ is a third value of third G color information of a third pixel on the final image.

6. The image capturing method of claim 3, wherein the first B color information and the second B color information are fused according to the following equation:

$$B_{dst} = (1 - \Sigma_{i=1}^{N} f_i) \cdot B_{src} + \Sigma_{i=1}^{N} f_i \cdot B_{res}^{i},$$

wherein $B_{src}$ is a first value of the second B color information on the first image, wherein $B_{res}^{i}$, is a second value of the first B color information of second pixel on an $i^{th}$ frame of an HDR image in the plurality of frames of HDR images, wherein N is a quantity of the frames, wherein $f_i$ is a third fusion coefficient in the third fusion coefficients that is determined on the first fusion curve based on the first value, and wherein $B_{dst}$ is a third value of third B color information of a third pixel on the final image.

7. A terminal device, comprising:
a lens;
a display:
a processor coupled to the lens and display; and
a memory coupled to the processor and configured to store instructions that, when executed by the processor, cause the terminal device to be configured to:
open, in response to a user operation, a camera application to start the lens;
display a viewfinder interface of the camera application on the display;
capture an original image using the lens;
convert the original image from the lens into a red-green-blue (RGB) image;
obtain a first image by performing one of decreasing a first luminance value of the RGB image to be less than a second luminance value, or increasing the first luminance value of the RGB image to be greater than a third luminance value, wherein the second luminance value is greater than the third luminance value;
convert the RGB image into a plurality of frames of high-dynamic-range (HDR) images, wherein the plurality of frames have different luminance values, and wherein the luminance values of the plurality of frames are greater than the second luminance value when the first luminance value is decreased to be less than the second luminance value, or the luminance values of the plurality of frames are less than the third luminance value when the first luminance value is increased to be greater than the third luminance value;
obtain a final image by fusing color information of a first plurality of first pixels corresponding to a same location on the first image and the plurality of frames of HDR images; and
display the final image on the viewfinder interface.

8. The terminal device of claim 7, wherein the instructions further cause the terminal device to be configured to:
further capture the original image using an exposure parameter;
determine, from a plurality of fusion curves, a first fusion curve corresponding to the exposure parameter, wherein the first fusion curve indicates a correspondence between color information and a fusion coefficient;
obtain a plurality of second pixels on the plurality of frames of HDR images corresponding to the same location of the first pixels of the first image;
determine, from the first fusion curve, based on color information of each of the second pixels, a corresponding fusion coefficient; and
obtain the final image by fusing, based on the corresponding fusion coefficient for each of the second pixels, the color information of the second pixels on the plurality of frames of HDR images and the color information of the first pixels on the first image.

9. The terminal device of claim 8, wherein the instructions further cause the terminal device to be configured to:
determine from the first fusion curve, based on first red (R) color information of each of the second pixels, a plurality of first fusion coefficients;
determine from the first fusion curve, based on first green (G) color information of each of the second pixels, a plurality of second fusion coefficients;
determine from the first fusion curve, based on first blue (B) color information of each of the second pixels, a plurality of third fusion coefficients;
fuse, based on the first fusion coefficients, the first R color information of the second pixels on the plurality of frames of HDR images and second R color information of the first pixels of the first image;
fuse, based on the second fusion coefficients, the first G color information of the second pixels and second G color information of the first pixels; and
fuse, based on the third fusion coefficients, the first B color information of the second pixels and second B color information of the first pixels.

10. The terminal device of claim 9, wherein the first R color information and the second R color information are fused according to the following equation:

$$R_{dst}=(1-\Sigma_{i=1}^{N}f_i)\cdot R_{src}+\Sigma_{i=1}^{N}f_i\cdot R_{res}^{i},$$

wherein $R_{src}$ is a first value of the second R color information on the first image, wherein $R_{res}^{i}$ is a second value of the first R color information of a second pixel on an $i^{th}$ frame of an HDR image in the plurality of frames of HDR images, wherein N is a quantity of the frames, wherein $f_i$ is a first fusion coefficient in the first fusion coefficients that is determined on the first fusion curve based on the first value, and wherein $R_{dst}$ is a third value of third R color information of a third pixel on the final image.

11. The terminal device of claim 9, wherein the first G color information and the second G color information are fused according to the following equation:

$$G_{dst}=(1-\Sigma_{i=1}^{N}f_i)\cdot G_{src}+\Sigma_{i=1}^{N}f_i\cdot G_{res}^{i},$$

wherein $G_{src}$ is a first value of the second G color information on the first image, wherein $G_{res}^{i}$ is a second value of the first G color information of a second pixel on an $i^{th}$ frame of an HDR image in the plurality of frames of HDR images, wherein N is a quantity of the frames, wherein $f_i$ is a second fusion coefficient in the second fusion coefficients that is determined on the first fusion curve based on the first value, and wherein $G_{dst}$ is a third value of third G color information of a third pixel on the final image.

12. The terminal device of claim 9, wherein the first B color information and the second B color information are fused according to the following equation:

$$B_{dst}=(1-\Sigma_{i=1}^{N}f_i)\cdot B_{src}+\Sigma_{i=1}^{N}f_i\cdot B_{res}^{i},$$

wherein $B_{src}$ is a first value of the second B color information, wherein $B_{res}^{i}$ is a second value of the first B color information of a second pixel on an $i^{th}$ frame of an HDR image in the plurality of frames of HDR images, wherein N is a quantity of the frames, wherein $f_i$ is a third fusion coefficient in the third fusion coefficients that is determined on the first fusion curve based on the first value, and wherein $B_{dst}$ is a third value of third B color information of a third pixel on the final image.

13. A computer program product comprising computer-executable instructions stored on a non-transitory computer-readable medium that, when executed by a processor, cause a terminal device to:
open, in response to a user operation, a camera application to start a lens;
display a viewfinder interface of the camera application;
capture an original image based on an exposure parameter using the lens;
convert the original image from the lens into a red-green-blue (RGB) image;

obtain a first image by performing one of decreasing a first luminance value of the RGB image to be less than a second luminance value, or increasing the first luminance value to be greater than a third luminance value, wherein the second luminance value is greater than the third luminance value;

convert the RGB image into a plurality of frames of high-dynamic-range (HDR) images, wherein the plurality of frames have different luminance values, and wherein the luminance values of the plurality of frames are greater than the second luminance value when the first luminance value is decreased to be less than the second luminance value, or the luminance values of the plurality of frames are less than the third luminance value when the first luminance value is increased to be greater than the third luminance value;

obtain a final image by fusing color information of a first plurality of first pixels corresponding to a same location on the first image and the plurality of frames; and display the final image on the viewfinder interface.

14. The computer program product of claim 13, wherein when the instructions further cause the terminal device to be configured to:

determine, from a plurality of fusion curves, a first fusion curve corresponding to the exposure parameter, wherein the first fusion curve indicates a correspondence between color information and a fusion coefficient;

obtain a second plurality of second pixels on the plurality of frames of HDR images corresponding to the same location of the first pixels on the first image;

determine from the first fusion curve, based on color information for each of the second pixels, a corresponding fusion coefficient; and further obtain the final image by fusing, based on the corresponding fusion coefficient for each of the second pixels, the color information of the second pixels on the plurality of frames of HDR images and the color information of the first pixels on the first image.

15. The computer program product of claim 14, wherein the instructions further cause the terminal device to be configured to:

determine from the first fusion curve, based on first red (R) color information of each of the second pixels, a plurality of first fusion coefficients;

determine from the first fusion curve, based on first green (G) color information of each of the second pixels, a plurality of second fusion coefficients;

determine from the first fusion curve, based on first blue (B) color information of each of the second pixels, a plurality of third fusion coefficients, fuse, based on the first fusion coefficients, the first R color information of the second pixels and second R color information of the first pixels;

fuse, based on the second fusion coefficients, the first G color information of the second pixels and second G color information of the first pixels; and fuse, based on the third fusion coefficients, the first B color information of the second pixels and second B color information of the first pixels.

16. The computer program product of claim 15, wherein the first R color information and the second R color information are fused according to the following equation:

$$R_{dst}=(1-\Sigma_{i=1}^{N}f_i)\cdot R_{src}+\Sigma_{i=1}^{N}f_i\cdot R_{res}^{i},$$

wherein $R_{src}$ is a first value of the second R color information on the first image, wherein $R_{res}$ is a second value of the first R color information of a second pixel on an $i^{th}$ frame of an HDR image in the frames, wherein N is a quantity of the frames, wherein $f_i$ is a first fusion coefficient in the first fusion coefficients that is determined on the first fusion curve based on the first value, and wherein $R_{dst}$ is a third value of third R color information of a third pixel on the final image.

17. The computer program product of claim 15, wherein the first G color information and the second G color information are fused according to the following equation:

$$G_{dst}=(1-\Sigma_{i=1}^{N}f_i)\cdot G_{src}+\Sigma_{i=1}^{N}f_i\cdot G_{res}^{i},$$

wherein $G_{src}$ is a first value of the second G color information on the first image, wherein $G_{res}^{i}$ is a second value of the first G color information of a second pixel on an $i^{th}$ frame of an HDR image in the frames, wherein N is a quantity of the frames, wherein $f_i$ is a second fusion coefficient in the second fusion coefficients that is determined on the first fusion curve based on the first value, and wherein $G_{dst}$ is a third value of third G color information of a third pixel on the final image.

18. The computer program product of claim 15, wherein the first B color information and the second B color information are fused according to the following equation:

$$B_{dst}=(1-\Sigma_{i=1}^{N}f_i)\cdot B_{src}+\Sigma_{i=1}^{N}f_i\cdot B_{res}^{i},$$

wherein $B_{src}$ is a first value of the second B color information, wherein $B_{res}^{i}$ is a second value of the first B color information of a second pixel on an $i^{th}$ frame of an HDR image in the frames, wherein N is a quantity of the frames, wherein $f_i$ is a third fusion coefficient in the third fusion coefficients that is determined on the first fusion curve based on the first value, and wherein $B_{dst}$ is a third value of third B color information of a third pixel on the final image.

* * * * *

UNITED STATES PATENT AND TRADEMARK OFFICE
CERTIFICATE OF CORRECTION

PATENT NO. : 11,595,588 B2
APPLICATION NO. : 17/284117
DATED : February 28, 2023
INVENTOR(S) : Liyao Zhang, Jing Ma and Zhibiao Zhao It is certified that error appears in the above-identified patent and that said Letters Patent is hereby corrected as shown below:

In the Claims

Claim 16, Column 26, Line 16: "wherein $R_{res}$ is a second" should read "wherein $R_{res}^{i}$ is a second"

Signed and Sealed this
Eleventh Day of April, 2023

Katherine Kelly Vidal
*Director of the United States Patent and Trademark Office*